United States Patent Office 3,320,331
Patented May 16, 1967

3,320,331
OXIDATIVE DEHYDROGENATION OF ALIPHATIC HYDROCARBONS OVER ALUMINUM PHOSPHATE SUPPORTED MOLYBDENUM AND VANADIUM
Noel J. Gaspar and Israel S. Pasternak, Sarnia, Ontario, Canada, assignors to Esso Research and Engineering Company, a corporation of Delaware
No Drawing. Filed Jan. 27, 1966, Ser. No. 523,268
19 Claims. (Cl. 260—683.3)

This invention relates to a novel catalyst system for the oxidative dehydrogenation of aliphatic hydrocarbons and in particular relates to a novel catalyst system for the oxidative dehydrogenation of paraffins. More particularly, this invention relates to a novel catalyst system comprising a major amount of aluminum phosphate and a minor amount of a heavy metal oxide selected from the group consisting of (a) molybdenum oxide, (b) vanadium pentoxide, and (c) a combination of (a) and (b). Still more particularly, this invention relates to a process for the oxidative dehydrogenation of aliphatics, which comprises contacting an aliphatic feed and oxygen in a reaction zone at a temperature of between about 900° F. and about 1300° F. with a catalyst comprising a major amount of aluminum phosphate and a minor amount of a heavy metal oxide selected from the group consisting of (a) molybdenum oxide, (b) vanadium pentoxide, and (c) a combination of (a) and (b).

It is known in the prior art that aliphatic materials can be converted to more highly unsaturated materials by various dehydrogenation methods. One such well-known commercial method is the Houdry process. This process is a thermal dehydrogenation of paraffins to olefins and hydrogen over a chromia alumina catalyst and is subject to thermodynamic limitations. For example, the reaction is carried out at high temperatures under vacuum, which results in a large and expensive reactor system. Conversions per pass are low, requiring a large recycle which expands recovery facilities and reactor sites. In addition, the high rate of coke lay-down requires frequent catalyst regenerations with the associated spare reactor and complex system of pipes and valves. The net result is a high investment with high operating costs.

It is further known that aliphatic materials can be dehydrogenated in the presence of halogen promoters and catalysts. While such processes are capable of producing good yields of unsaturated compounds, they require the utilization and regeneration of relatively expensive halogens.

In accordance with the present invention, aliphatics, such as light paraffins, are contacted with an oxygen-containing gas in the presence of a novel catalyst to form olefins and water. As water is a very stable product thermodynamically, the reaction is not equilibrium limited and atmospheric pressure can be employed. Moreover, the oxygen in the feed gas keeps the catalyst free of coke and catalyst regeneration is substantially eliminated.

It is, therefore, an object of the present invention to provide a novel catalyst for the oxidative dehydrogenation of aliphatic materials. A further object of the present invention is to provide a catalyst for the oxidative dehydrogenation of paraffins, such as light paraffins.

A still further object of the present invention is to provide a process for the catalytic oxidative dehydrogenation of aliphatic materials to olefins and water.

The exact nature, substance and objects of the present invention will be more clearly perceived and understood by referring to the following description and claims.

It has now been discovered that aliphatic materials can be catalytically dehydrogenated by contacting an aliphatic feed and an oxygen-containing gas in a reaction zone at a temperature of between about 900° F. and about 1300° F. with a catalyst comprising a major amount of aluminum phosphate and a minor amount of a heavy metal oxide selected from the group consisting of (a) molybdenum oxide, (b) vanadium pentoxide and (c), a combination of (a) and (b).

Aliphatic feed stocks which can be dehydrogenated by the present process include paraffins and olefins containing between 2 and 20 carbon atoms. Preferably, the aliphatic feed is a hydrocarbon material containing between 2 and 8 carbon atoms and more preferably, is a paraffin containing between 2 and 6 carbon atoms. Especially preferred are the light or normally gaseous hydrocarbons, such as ethane, propane, butane, butene, isobutane, isobutene and the like; and the normally liquid hydrocarbons such as pentane, pentene, isopentane, isopentene, hexane, hexene, octane, octene and the like.

The oxygen employed as feed in the present process can be supplied to the reaction zone in any readily usable form. Conveniently, oxygen is supplied as an oxygen-containing gas, e.g., air, which contains between about 19 and about 21 weight percent oxygen. While it is preferable to employ air, oxygen-enriched air having more than 21 weight percent oxygen can be employed. Furthermore, an inert diluent such as nitrogen and/or steam can be used to lower the oxygen content of the oxygen-containing gas to below 19%. In general, the mole ratio of oxygen to aliphatic feed can vary between about 0.25:1 and about 1.5:1 and preferably, is about 1:1.

The novel catalytic system employed in the present process for dehydrogenating aliphatics to olefins and water comprises aluminum phosphate doped with one or more heavy metal oxides selected from the group consisting of molybdenum oxide and vanadium pentoxide. The amount of heavy metal oxide admixed with the aluminum phosphate can vary over a wide range. In general, the present catalytic system comprises a major amount of aluminum phosphate and a minor amount of molybdenum oxide, vanadium pentoxide, or a combination of the two. Thus, the heavy metals, as their oxides, can amount to between about 1 and about 49 mole percent of the total active catalyst specie. Preferably, the aluminum phosphate is doped with between about 2.5 and about 10 mole percent of said heavy metal(s) in the form of their oxides. More preferably, the aluminum phosphate is doped with about 5 mole percent of said heavy metal(s). Amounts over about 10 mole percent do not produce substantially improved results.

With respect to the catalyst comprising aluminum phosphate and a minor amount of molybdenum oxide, it has been found that best results are obtained when between about 2.5 and 5.0 mole percent molybdenum, as its oxide, is employed. In addition, it has further been found that the blue form of molybdenum oxide (probably $Mo_4O_{11}$) produces better results than that obtained with the use of the fully oxidized form of molybdenum oxide ($MoO_3$).

When the catalyst specie employed is that of aluminum phosphate doped with a minor amount of vanadium pentoxide, it has been found that best results are obtained when between about 5 and about 10 mole percent of vanadium, as its pentoxide, is employed.

In the case where the catalyst specie employed comprises aluminum phosphate doped with a minor amount of a mixture of molybdenum oxide and vanadium pentoxide, it has been found that best results are obtained when the amount of the mixed metals to aluminum phosphate is between about 2.5 and about 10 mole percent, preferably about 5 mole percent. In preparing the mixed metal oxides of molybdenum and vanadium, the mole ratio of vanadium to molybdenum in the mixture can vary over a wide range. In general, the mole ratio of vanadium to molybdenum can vary between about 20:1 and about 1:20, preferably between about 9:1 and about 1:9 and more preferably is about 4:1.

In general, the amount of catalyst employed to dehydrogenate the aliphatic feed varies over a wide range and is more or less determined by the design of the reactor.

The catalyst species employed in the present process can be prepared in any conventional manner. For example, aluminum phosphate and the heavy metal oxide(s) can be dry-mixed; slurried with water; dried; pelleted, calcined; and crushed into granules for use. In another convenient method, aluminum phosphate can be soaked in a solution of the required amounts of the ammonium salts of the heavy metals employed. This solution is then evaporated to dryness and the solid ground up, pilled, calcined and crushed.

Dehydrogenation of aliphatics in accordance with the present process can be carried out in any suitable reaction vessel. A typical example of such a reaction vessel is a riser-type reactor. The reactor can contain either a fixed or fluidized catalyst bed. However, since the oxidative dehydrogenation of aliphatics is an exothermic reaction, the use of a fluidized catalyst bed is preferred. In addition, any conventional techniques designed to prevent the formation of a temperature build-up in the catalyst bed, e.g., catalyst dilution with low surface area inert material or the "spreading-out" of the catalyst in a large number of small diameter, parallel, fixed-bed tubes can be employed with advantage.

The present oxidative dehydrogenation process is generally carried out at temperatures of between about 900° F. and about 1300° F., preferably between about 1100° F. and about 1200° F. The pressure within the reaction zone is not critical and will generally be atmospheric pressure; however, superatmospheric pressures such as between about 5 and about 100 p.s.i.g. can be successfully employed.

The space velocity of the hydrocarbon in the dehydrogenation reaction is dependent upon the temperature at which the reaction is performed. The higher the temperature employed, the shorter the required contact time. In general, the space velocity of the hydrocarbon feed will vary between about 0.25 and about 3 weights of hydrocarbon per weight of catalyst per hour (w./w./hr.), preferably, the space velocity will be between about 0.5 and about 1.5 w./w./hr. and more preferably will be between about 0.5 and about 1.0 w./w./hr. Contact times will, accordingly, vary between about 0.2 and about 10 seconds.

In a typical process scheme, aliphatic feed and air, metered individually through rotameters, are mixed and passed into a stainless steel reactor in an electrically heated tube furnace. The reactants are preheated over inert beads and passed into the reaction zone filled with crushed (10–20 mesh) catalyst. Dehydrogenated products leave the furnace; are quenched in a water-cooled condenser; go into a separator where the liquid products are removed and the gas is either vented or collected in, for example, a plastic balloon. Samples can be taken from the balloon for gas chromatographic analysis. Orsat analysis, as well as density and volume measurements, can be taken on the balloon contents and from these measurements a weight balance for the run and a complete analysis of the products can be calculated. For fluid beds, 40–60 mesh granules of catalyst can be employed.

The present process is more particularly described in the following examples which are intended as illustrative only since numerous modifications and variations therein will be apparent to those skilled in the art.

In the following examples, catalyst species were prepared as follows:

(A) ALUMINUM PHOSPHATE

Aluminum phosphate was prepared by dissolving aluminum nitrate in dilute nitric acid, adding a stoichiometric quantity of phosphoric acid and neutralizing with ammonium hydroxide. The precipitate was filtered, washed and dried.

(B) ALUMINUM PHOSPHATE-MOLYBDENUM OXIDE CATALYSTS

Aluminum phosphate was doped with molybdenum by mixing with dry molybdenum oxide ($MoO_3$) or molybdenum blue ($Mo_4O_{11}$), slurrying with water, drying, pelletting and calcining at 1100–1200° F. for about three hours. Molybdenum blue was prepared by the method described by Schirmer et al., "The Composition and Structure of Molybdenum Blue," J.A.C.S., 64, 2543 (1942).

(C) ALUMINUM PHOSPHATE-VANADIUM CATALYST

Aluminum phosphate was doped with vanadium in accordance with the procedure described above with respect to molybdenum (paragraph B) except that vanadium pentoxide was employed in place of the molybdenum oxide.

(D) ALUMINUM PHOSPHATE (MOLYBDENUM-VANADIUM) CATALYSTS

The molybdenum-vanadium on aluminum phosphate catalysts were made in the following manner. Molybdenum trioxide and vanadium pentoxide were mixed together in a mortar in the desired proportions. The mixture was heated in a muffle furnace and fused. After cooling, the solid mass was crushed to a fine powder. The required amount of this powder was dry-mixed with powdered aluminum phosphate, slurried with water, dried, pelleted, calcined at 1100–1200° F. for about three hours and crushed into 10–20 mesh granules for use in the reactor. For fluid bed runs, a 40–60 mesh fraction was used.

(E) Aluminum phosphate was doped in accordance with the procedures described in paragraph B above with niobium (as $No_2O_5$), chromium (as $Cr_2O_3$), and tungsten (as tungsten blue, $W_4O_{11}$, prepared by the reduction of sodium tungstate with zinc and HCl).

*Example 1 (Runs 1–2)*

In the following runs, an n-butane-air feed was passed over a fixed catalyst bed at atmospheric pressure in a one-inch stainless steel tubular reactor. Butane space velocity was about 1 w./w./hr.; the reaction temperature was about 1100° F.; and the mole ratio of oxygen to n-butane was about 1:1. The aluminum phosphate-molybdenum oxide catalyst was prepared in accordance with the above-described procedures by adding molybdenum oxide to an aqueous slurry of aluminum phosphate so as to give 2.5 mole percent molybdenum on the aluminum phosphate. The slurry was mixed thoroughly and dried at 230° F. The resulting dried product was calcined at 1200° F. in air for three hours and crushed into 10–20 mesh granules for use in the reactor. Thirty cubic centimeters of catalyst were charged to the reactor. The results of runs 1–2 are found in Table I.

TABLE I

| Run | Catalyst | Selectivity to $C_4$ Olefin at 35% n-$C_4$ Conversion, Mole percent | Percent Increase in Selectivity |
|---|---|---|---|
| 1 | $AlPO_4$ | 24.0 | |
| 2 | $AlPO_4$-2.5 mole percent Mo as $MoO_3$. | 40.0 | +67 |

The data contained in Table I shows that the addition of molybdenum oxide to aluminum phosphate resulted in a considerable increase in the yields of $C_4$ olefins and diolefins.

Example 2 (Runs 3–9)

In Runs 3–5, an n-butane feed was dehydrogenated in the fixed bed reactor of Example 1 and in a fluid bed reactor made of one-inch vycor glass tubing employing aluminum phosphate and aluminum phosphate doped with 2.5 mole percent molybdenum as molybdenum blue as the catalyst species. In Runs 6–9, a 1-butene feed was subjected to dehydrogenation with the aluminum phosphate-molybdenum blue catalyst. Reaction conditions and results are summarized in Table II.

The data of Table III show that the optimum concentration of vanadium for maximum activity was about 5–10 mole percent. At this level, selectivities were about 50% improved over those for pure aluminum phosphate. No appreciable improvement in yield or selectivities is obtained by doping above the 10 mole percent level.

Example 4 (Runs 15–19)

Aluminum phosphate was doped at the 3, 5, 7 and 9 mole percent level with a mixture containing vanadium TABLE II.—CONVERSION OF BUTANE AND BUTENE TO BUTENES AND BUTADIENE WITH 2.5% Mo(BLUE) ON AlPO$_4$ CATALYSTS

| Run No. | Catalyst | Bed | Temp., °F. (Temp. max. °F.) | HC SV, w./w./hr. | O$_2$*/HC Ratio | Conversion, mole percent | Selectivity, mole percent | | Butadiene to Butenes in Product |
|---|---|---|---|---|---|---|---|---|---|
| | | | | | | | To C$_4$- | To C$_4$= | |
| (a) Butane Feed: | | | | | | | | | |
| 3 | AlPO$_4$ | Fixed | 1,100 (1,170) | 1 | 1 | 32.3 | 17.3 | 10.3 | 0.6 |
| 4 | AlPO$_4$+2.5% Mo (Blue) | do | 1,100 (1,100) | 1 | 1 | 31.4 | 25.4 | 12.8 | 0.5 |
| 5 | do | Fluid | 1,100 (1,130) | 1 | 1 | 36.2 | 18.1 | 19.9 | 1.1 |
| (b) Butene Feed: | | | | | | | | | |
| 6 | do | Fixed | 800 (1,020) | 1.5 | 1 | 44.6 | | 40.5 | |
| 7 | do | Fluid | 1,100 (1,145) | 2 | 1 | 45.5 | | 44.4 | |
| 8 | do | do | 1,100 (1,160) | 2 | 1.5 | 59.1 | | 42.3 | |
| 9 | do | do | 1,200 (1,260) | 3 | 1.5 | 72.8 | | 38.3 | |

*As air.

The data of Table II show that the addition of molybdenum blue increased the selectivity to olefins from butane by about 5–10% without changing the ratio of butadiene to butenes in the products. In going to a fluid bed, only a slight increase in the over-all olefin selectivity was observed, but the ratio of butadiene to butenes in the product was doubled. With a butene feed, about a 5% increase in selectivity at constant conversion was observed when going from a fixed to a fluid bed.

Example 3 (Runs 10–14)

Aluminum phosphate, doped with various amounts of vanadium pentoxide, was prepared in accordance with the method described hereinabove. This catalyst was then employed in Runs 11–14 to dehydrogenate n-butane in a similar reactor to that employed in Example 1. A run with aluminum phosphate as the catalyst was also performed for comparison purposes. Results are summarized in Table III.

pentoxide and molybdenum oxide such that the mole ratio of vanadium to molybdenum was 4 to 1. These catalysts were used for the oxidative dehydrogenation of n-butane in the 1-inch stainless steel reactor of Example 1. The catalyst was prepared in the manner described hereinabove. Reaction conditions and results of Runs 15–19 are summarized in Table IV.

TABLE IV.—OXIDATIVE DEHYDROGENATION OF n-BUTANE WITH 80 V-20 Mo MIX ON ALUMINUM PHOSPHATE CATALYST

[n-C$_4$ Space Velocity=0.5 w./w./hr.; O$_2$*/HC Feed Mole Ratio=1/1]

| Run No. | Catalyst AlPO$_4$ Doped with— | Temp., °F. (Temp., max. °F.) | Conversion, percent | Selectivity to C$_4$ Olefins, mole percent | Olefin Yield, mole percent | Butadiene/ Butene in Product |
|---|---|---|---|---|---|---|
| 15 | | 1,100 (1,176) | 34.6 | 28.6 | 9.9 | 0.6 |
| 16 | 3 mole percent (80 V/20Mo) | 1,100 (1,150) | 39.7 | 32.9 | 13.1 | 0.2 |
| 17 | 5 mole percent (80 V/20 Mo) | 1,100 (1,183) | 39.6 | 39.4 | 15.6 | 0.15 |
| 18 | 7 mole percent (80 V/20 Mo) | 1,100 (1,160) | 40.0 | 39.1 | 15.6 | 0.15 |
| 19 | 9 mole percent (80 V/20 Mo) | 1,100 (1,190) | 41.6 | 37.1 | 15.4 | 0.16 |

*As air.

The data contained in Table IV show that the addition of 3 mole percent of the 80/20 V/Mo mixture to the aluminum phosphate resulted in an increase in olefin selectivity at constant conversion. Five mole percent of the vanadium-molybdenum mixture caused a further increase in olefin selectivity; however, no further increase in selectivity was obtained above the 5 mole percent level.

Example 5 (Runs 20–24)

Mixtures of vanadium pentoxide and molybdenum oxide with vanadium/molybdenum molar ratios of 90/10, TABLE III.—DEHYDROGENATION OF n-BUTANE ON ALUMINUM PHOSPHATE-VANADIUM CATALYST

| Run No. | Catalyst | Temp., °F. (Temp., max. °F.) | HC SV w./w./hr. | O$_2$*/HC | C$_4$ Conversion, percent | Selectivity to C$_4$ Olefins, mole percent |
|---|---|---|---|---|---|---|
| 10 | AlPO$_4$ | 1,100 (1,165) | 1 | 1 | 32.4 | 22.5 |
| 11 | AlPO$_4$+2.5% V as V$_2$O$_5$ | 1,100 (1,150) | 1 | 1 | 37.3 | 24.6 |
| 12 | AlPO$_4$+5% V as V$_2$O$_5$ | 1,100 (1,165) | 1 | 1 | 38.4 | 34.0 |
| 13 | AlPO$_4$+10% V as V$_2$O$_5$ | 1,100 (1,145) | 1 | 1 | 37.9 | 34.2 |
| 14 | AlPO$_4$+25% V as V$_2$O$_5$ | 1,100 (1,150) | 1 | 1 | 37.1 | 29.5 |

*As air.

75/25, 50/50, 25/75 and 10/90 respectively were prepared in accordance with the procedures outlined hereinabove. These mixtures were each doped, at the 5 mole percent (V+Mo) level, onto aluminum phosphate and were employed as catalysts for the oxidative dehydrogenation of n-butane. Reaction conditions and results of runs 20–24 are summarized in Table V.

and the yields of olefins were increased. The data in Table VI further shown that in the fluid bed runs employing an oxygen/hydrocarbon mole ratio of 1, the relative amount of butadiene to butene in the product was greatly increased.

*Example 7 (Runs 28–32)*

In order to compare the catalytic activity of other heavy metal oxides from Groups V–B and VI–B of the Periodic Table with that of vanadium, aluminum phosphate was doped with the oxides of vanadium, niobium, chromium and tungsten in accordance with the procedures outlined hereinabove. These catalysts were employed in a 1-inch stainless steel fixed bed reactor for the oxidative dehydrogenation of n-butane. Reaction conditions and results are tabulated in Table VII.

TABLE V.—OXIDATIVE DEHYDROGENATION OF n-BUTANE VARYING V/Mo RATIO ON AlPO4 CATALYST

[n-C4 Space Velocity=0.5 w./w./hr.; O2*/HC Feed Mole Ratio=1/1]

| Run No. | Catalyst AlPO4 Doped with 5% of— | Temp., °F. (Temp. max. °F.) | Conversion, percent | Selectivity to C4 Olefins, mole percent | Olefin Yield, mole percent | Butadiene/ Butene in Product |
|---|---|---|---|---|---|---|
| 20 | (90 V/10 Mo) | 1,100 (1,172) | 31.1 | 41.0 | 12.8 | 0.24 |
| 17 | (80 V/20 Mo) | 1,100 (1,183) | 39.6 | 39.4 | 15.6 | 0.15 |
| 21 | (75 V/25 Mo) | 1,100 (1,135) | 31.9 | 40.7 | 13.0 | 0.16 |
| 22 | (50 V/50 Mo) | 1,100 (1,170) | 33.0 | 48.5 | 16.0 | 0.18 |
| 23 | (25 V/75 Mo) | 1,100 (1,145) | 35.1 | 36.5 | 11.5 | 0.23 |
| 24 | (10 V/90 Mo) | 1,100 (1,177) | 39.0 | 42.0 | 16.4 | 0.36 |

*As air.   **From Table IV.

The data of Table V show that no substantial difference in results were obtained by varying the mole ratio of vanadium to molybdenum over a wide range in a catalyst specie employing 5 mole percent of the respective mixtures.

*Example 6 (Runs 25-27)*

In an attempt to decrease the temperature rise in the catalyst bed, a 1-inch Vycor reactor with a fluidized bed of 5 mole percent (80V–20 Mo) on aluminum phosphate catalyst was employed to effect oxidative dehydrogenation of n-butane. Conditions and results of Runs 25–27 are summarized in Table VI.

TABLE VII.—CATALYTIC ACTIVITY OF GROUPS V–B AND VI–B OXIDES ON AlPO4

| Run No. | Catalyst—Groups V–B and VI–B | Temp., °F. (Temp., max. °F.) | HC SV w./w./hr. | O2*/HC | Conversion, percent | Selectivity to C4 Olefins, mole percent | Yield, percent |
|---|---|---|---|---|---|---|---|
| 28 | AlPO4 | 1,100 (1,146) | 1 | 1 | 31.6 | 31.4 | 9.9 |
| 29 | AlPO4+4% Cr as Cr2O3 | 1,100 (1,285) | 1 | 1 | 48.0 | 21.0 | 10.1 |
| 30 | AlPO4+2.5% Nb as Nb2O5 | 1,100 (1,280) | 1 | 1 | 44.0 | 20.5 | 9.0 |
| 31 | AlPO4+2.5% V as V2O5 | 1,100 (1,215) | 1 | 1 | 53.3 | 26.1 | 13.9 |
| 32 | AlPO4+2.5% W as W4O11 | 1,100 (1,255) | 1 | 1 | 40.9 | 15.1 | 6.2 |

*As air.

The data contained in Table VII show that chromium and niobium had very little effect on the yields compared with aluminum phosphate; vanadium gave a marked improvement; while tungsten definitely depressed yields.

TABLE VI.—OXIDATIVE DEHYDROGENATION OF n-BUTANE FLUID BED RUNS WITH 5% (80 V/20 Mo) ON AlPO4 CATALYST

| Run No. | Temp., °F. (Temp., Max. °F.) | HC Space Velocity, w./w./hr | O2*/HC | Conversion, percent | Selectivity to C4 Olefins, mole percent | Yield mole percent | Butadiene/ Butenes in Product |
|---|---|---|---|---|---|---|---|
| 25 | 1,100 (1,164) | 1 | 1 | 38.9 | 34.1 | 13.3 | 0.40 |
| 26 | 1,100 (1,155) | 1 | 1.5 | 43.2 | 37.7 | 16.3 | 1.05 |
| 27 | 1,200 (1,270) | 1 | 1.5 | 57.5 | 31.7 | 18.2 | 1.83 |

* As air.

The data of Table VI show that better participation is obtained in a fluid bed than in a fixed bed. In the fixed bed reactor, an oxygen/hydrocarbon mole ratio of 1.5 caused temperature rises in the catalyst bed of between 250 and 300° F. Moreover, the yields of olefins were generally lower than those of a lower oxygen/feed concentration. However, in the fluid bed, temperature rises of only 60–75° F. were observed at these conditions,

*Example 8 (Runs 33–34)*

In order to further show the uniqueness of the present catalyst system, an alumina catalyst was compared with aluminum phosphate in a manner similar to Example 1. The alumina catalyst was prepared by heating β-trihydrate alumina to 1600° F. for eight hours. Reaction conditions and results are summarized in Table VIII.

TABLE VIII.—COMPARISON OF CATALYTIC ACTIVITY OF ALUMINUM PHOSPHATE AND ALUMINA FOR OXIDATIVE DEHYDROGENATION OF n-BUTANE

| Run No. | Catalyst | Temp., °F. (Temp., max. °F.) | HC SV, w./w./hr. | O2*/HC | C4 Conversion percent | Selectivity to C4 Olefins, mole percent |
|---|---|---|---|---|---|---|
| 33 | Al2O3 | 1,100 (1,165) | 1 | 1.5 | 50.6 | 7.3 |
| 34 | AlPO4 | 1,100 (1,165) | 1 | 1.5 | 46.6 | 18.1 |

*As air.

The data of Table VIII show that the alumina catalyst was very active for burning and cracking reactions; but, resulted in a very low selectivity to olefins as compared to the aluminum phosphate catalyst.

While the above examples have been illustrated by employing n-butane and n-butene as the aliphatic feed, it is to be noted that the instantly described novel catalyst and process are equally effective for other aliphatic feeds, e.g., those described hereinabove.

While there are above-described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A process for the oxidative dehydrogenation of aliphatic hydrocarbons, which comprises contacting an aliphatic feed and oxygen in a reaction zone at a temperature of between about 900° F. and about 1300° F. with a catalyst comprising a major amount of aluminum phosphate and a minor amount of a heavy metal oxide selected from the group consisting of (a) molybdenum oxide, (b) vanadium pentoxide, and (c) a combination of (a) and (b).

2. A process according to claim 1 wherein said aliphatic feed is a $C_2$–$C_{20}$ hydrocarbon.

3. A process according to claim 1 wherein said aliphatic feed is a $C_2$–$C_6$ paraffin.

4. A process according to claim 1 wherein said dehydrogenation temperature is between about 1100° F. and about 1200° F.

5. A process according to claim 1 wherein said catalyst is aluminium phosphate doped with between about 2.5 and about 10 mole percent of said heavy metals in the form of their oxides.

6. A process according to claim 1 wherein said catalyst is aluminum phosphate doped with between about 2.5 and about 10 mole percent of a mixture of molybdenum and vanadium in the form of their oxides, the mole ratio of vanadium to molybdenum being about 20:1 and about 1:20.

7. A process according to claim 6 wherein said mole ratio of vanadium to molybdenum is between about 9:1 and about 1:9.

8. A process according to claim 1 wherein said molybdenum oxide is the blue form of molybdenum oxide having the empirical formula, $Mo_4O_{11}$.

9. A process according to claim 1 wherein the mole ratio of oxygen to aliphatic feed is between about 0.25:1 and about 1.5:1.

10. A process according to claim 1 wherein the aliphatic hydrocarbon feed is passed through the reaction zone at a space velocity of between about 0.25 w./w./hr. and about 3 w./w./hr.

11. An oxidative dehydrogenation catalyst consisting essentially of a major amount of aluminum phosphate and a minor amount of a heavy metal oxide selected from the group consisting of (a) molybdenum oxide, (b) vanadium pentoxide, and (c) a combination of (a) and (b).

12. A catalyst according to claim 11 wherein said aluminum phosphate is doped with between about 2.5 and about 10 mole percent of said heavy metals in the form of their oxides.

13. A catalyst according to claim 11 wherein said aluminum phosphate is doped with between about 2.5 and about 10 mole percent of a mixture of molybdenum and vanadium in the form of their oxides, the mole ratio of vanadium to molybdenum being between about 20:1 and about 1:20.

14. A catalyst according to claim 13 wherein said mole ratio of vanadium to molybdenum is between about 9:1 and about 1:9.

15. A catalyst according to claim 11 wherein said molybdenum oxide is the blue form of molybdenum oxide having the empirical formula $Mo_4O_{11}$.

16. A process for the oxidative dehydrogenation of n-butane, which comprises contacting n-butane and oxygen in a reaction zone at a temperature of between about 1100° F. and about 1200° F. with a catalyst comprising aluminum phosphate doped with about 2.5 mole percent of molybdenum as its oxide.

17. A process for the oxidative dehydrogenation of n-butane, which comprises contacting n-butane and oxygen in a reaction zone at a temperature of between about 1100° F. and about 1200° F. with a catalyst comprising aluminum phosphate doped with about 2.5 mole percent of molybdenum as molybdenum blue.

18. A process for the oxidative dehydrogenation of n-butane, which comprises contacting n-butane and oxygen in a reaction zone at a temperature of between about 1100° F. and about 1200° F. with a catalyst comprising aluminum phosphate doped with about 5 mole percent of a mixture of vanadium and molybdenum in the form of their oxides, the mole ratio of vanadium to molybdenum being between about 20:1 and about 1:20.

19. A process for the oxidative dehydrogenation of n-butane, which comprises contacting n-butane and oxygen in a reaction zone at a temperature of between about 1100° F. and about 1200° F. with a catalyst comprising aluminum phosphate doped with about 5 mole percent of vanadium in the form of its oxide.

References Cited by the Examiner

UNITED STATES PATENTS

| | | | |
|---|---|---|---|
| 2,440,236 | 4/1948 | Stirton | 260—683.3 |
| 2,441,297 | 5/1948 | Stirton | 260—683.3 |
| 2,942,932 | 6/1960 | Elliott | 23—2.2 |
| 3,177,151 | 4/1965 | Calvert | 252—437 X |

DELBERT E. GANTZ, *Primary Examiner.*

G. E. SCHMITKONS, *Assistant Examiner.*